United States Patent

[11] 3,617,810

[72] Inventor Floyd L. Steen
　　　　　　　Lansdowne, Pa.
[21] Appl. No. 61,904
[22] Filed Aug. 7, 1970
[45] Patented Nov. 2, 1971
[73] Assignee General Electric Company

[54] TURN-ON DIRECTING CIRCUIT FOR STATIC SWITCH
4 Claims, 4 Drawing Figs.

[52] U.S. Cl. ................................................. 317/33 SC,
　　　　　307/133, 307/242, 307/252, 323/22 SC
[51] Int. Cl. ....................................................... H02h 3/08
[50] Field of Search .......................................... 323/22 SC;
　　　317/33 SC; 307/133, 242, 252 T, 252 UA; 321/45 S

[56] References Cited
UNITED STATES PATENTS
3,283,179  11/1966  Carlisle et al. ................ 307/133
3,486,038  12/1969  Skamfer et al. ................ 307/252
3,558,983  1/1971  Steen ............................ 317/33 SC Primary Examiner—James D. Trammell
Attorneys—J. Wesley Haubner, Barry A. Stein, Frank L. Neuhauser, Oscar B. Waddell and Joseph B. Forman ABSTRACT: A turn-on directing circuit is provided for a static switch. The switch includes an oscillator for producing a train of discrete control signals, control signal enabling means and logic circuit means. When switch conduction is desired an ON signal is provided to the enabling means to enable said means to effect switch turn-on. The turn-on directing circuit includes a supervisory circuit which temporarily disables the enabling means if a control signal is in existence when the ON signal is given and for reenabling the enabling means in time to allow the first successive control signal following the ON signal to effect switch turn-on.

INVENTOR:
FLOYD L. STEEN,
BY Barry A. Stein
ATTORNEY

TURN-ON DIRECTING CIRCUIT FOR STATIC SWITCH

BACKGROUND AND OBJECTS OF THE INVENTION

This invention relates to electric power switching apparatus and to protective means therefor, and more particularly it relates to a combination of a thyristor switch which is intended selectively to permit the flow of electric current between a source and a load when provided with gate pulses from a control circuit and means for insuring that only gate pulses of full duration are supplied to said switch when commanded to "close." Such a construction helps the switch to tolerate the abrupt inrush of current that may result if said switch were closed on a fault.

In the art of electric power distribution and utilization, it is common practice to employ switches or circuit breakers in order to initiate or terminate the flow of load current on command from a control circuit. These switches may advantageously be constructed to solid state, high-current controllable switching devices such as thyristors. A silicon controlled rectifier (SCR) is one type of thyristor that can be used in such switches. Since thyristor switches do not utilize any moving parts for circuit completion or interruption, they are known in the art as static switches. Static switches may be provided with overcurrent protective means to enable them to interrupt the flow of load current in response to a sensed overcurrent of a preselected magnitude.

As is well know, an SCR comprises a body of semiconductor material having a plurality of layers of alternately P- and N-type conductivity which form a plurality of back-to-back rectifying junctions therein. In a high-current SCR these junctions will have relatively broad areas (e.g., at least 1 square inch). The semiconductor body is disposed between a pair of main electrodes, one known as the anode and the other as the cathode. Thyristors additionally include some form of gating means which is operative for initiating current conduction between the anode and cathode. In a conventional SCR the gating means is a gate electrode, which is connected to one of the semiconductor layers at one or more points. When connected to a source of voltage and a load, an SCR will ordinarily block appreciable current flow between its anode and cathode until triggered or fired by a signal to its gate electrode at a time when the potential of its anode is positive with respect to cathode, whereupon it abruptly switches to a relatively low resistance, forward current conducting state.

When a trigger signal is applied to the gate electrode of a conventional high-current SCR, conduction begins in a relatively small portion of the junction area adjacent to the gate electrode, and the turned on area then gradually increases in size and eventually spreads over the whole effective junction area of the semiconductor body. Various techniques are known for enlarging the area initially turned on and for decreasing the time it takes for the entire junction to become conductive, but it all events the area across which anode current starts flowing is less than the full area provided for steady state load current conduction. This results in an initially high current density, and if the rate of rise of current ($di/dt$) is very high the heat generated in the small conducting area may reach a degree that causes damage to the SCR.

It is old in the art to connect inductors or reactors in series with SCR switches in order to limit $di/dt$ to a safe value. Nevertheless, in certain situations, e.g., where the load has become a short circuit, a reactor sufficiently large to prevent excessive $di/dt$ may be economically impractical.

A prior approach for improving the $di/dt$ capability of a high-current SCR is to "overdrive" its gate. This involves generating a trigger signal whose magnitude is initially much higher than the minimum required to fire the SCR, whereby a larger-than-normal junction area is initially turned on.

It is sometimes advantageous to utilize a free running signal generator or oscillator to produce a train of discrete control signals for triggering an SCR switch into conduction. A controllable inhibit circuit is usually associated with the signal generator to inhibit its operation, or to suppress the control signals that it generates, so as to prevent triggering the switch until conduction is desired. When conduction is desired, an ON command is supplied to the inhibit circuit, whereupon the latter ceases inhibiting the control signals which can then commence to effect triggering of the switch. Heretofore it has been possible to give the ON command at an instant in time during the production of a control signal, in which event only the ensuing portion of that control signal will be available for triggering the switch. Consequently the duration of the initial gate pulse applied to the switch would be abnormally short, and the triggering action might be inadequate to ensure safe turn on of the SCR in the face of a high $di/dt$ before the succeeding full-width signal appears.

Providing trigger signals that are initially overdriven may not eliminate this problem since a random ON command may be given during the production of a trigger signal but after its overdriven portion has terminated.

It is a general object of my invention to provide an improved control circuit for a thyristor switch that overcomes the problem which I have identified above.

It is a further object of my invention to provide a circuit for insuring that only full width trigger signals are supplied to a thyristor switch irrespective of the instant in time when an ON command is given.

SUMMARY OF THE INVENTION

A turn-on direction circuit is provided for a static switch connected between an alternating voltage source and a load in an electric power system. The static switch includes a control circuit comprising signal generator means, which is normally operative to produce a continuous train of discrete control signals, control signal enabling means and logic circuit means. The logic circuit, in response to an ON command, given when switch conduction is desired, provides an ON signal to the enabling means for enabling the control signals to effect turn on of the switch. The switch also includes overcurrent detecting means for providing an OFF signal in response to he detection of a fault current of a preselected magnitude.

The novel turn on directing circuit includes supervisory means operative for temporarily disabling the enabling means if a control signal is in existence when an ON command is given and for re-enabling the enabling means in time to allow the first successive control signal following the ON command to effect switch turn on. The supervisory means is also operative for disabling the enabling means in response to an OFF signal from said overcurrent detecting means.

DETAILED DESCRIPTION OF THE PREFERRED EMBODIMENT OF THE INVENTION

Figure 1:
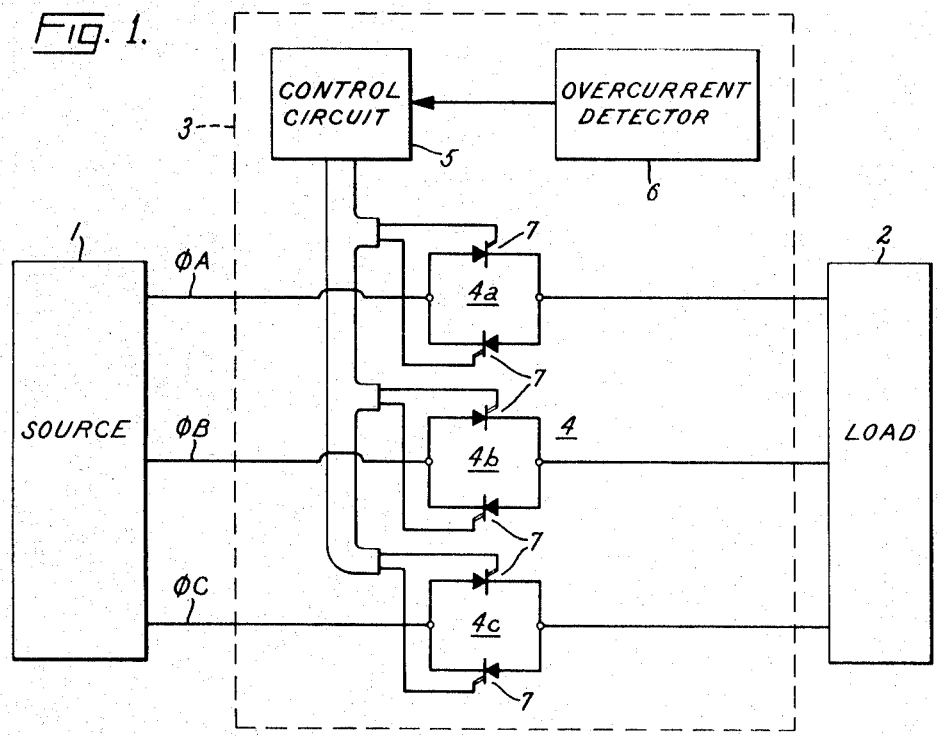
FIG. 1 is a functional block diagram of a power system including a thyristor switch controlled in accordance with my invention.

As can be seen in FIG. 1 a three-phase 60-Hertz alternating voltage source 1 is arranged to supply electric power to a load circuit shown as a block 3. In order to initiate or to terminate the flow of current to the load 3, a circuit breaker 2 is provided between the source and the load. This circuit breaker is denoted as a Static System Protector in that it includes a solid-state or static switch 4.

In order to control conduction of the static switch 4, i.e., initiate or terminate current conduction therein, the Static System Protector 2 also includes a control circuit 5 having two states or modes, namely "ON" and "OFF." The control circuit 5 is arranged to be actuated from its ON to its OFF states (thereby causing the static switch 4 to interrupt the flow of load current) either manually or from a signal provided by suitable means which automatically responds to a sensed fault, such as overcurrent detecting circuit 6. Further, the Static System Protector may include commutation means (not shown) to force commutate the static switch in high-speed response to detection of a fault current by the detecting circuit 6.

The static switch 4 comprises one thyristor switch for each phase of the power system, namely 4a, 4b and 4c. In order to provide for bidirectional load current conduction, each of the phase switches is shown as comprising a pair of inverse parallel connected thyristor legs 7.

Thyristor legs 7 are shown as having a double-gate electrode in order to symbolically represent that each leg may comprise a parallel array of similarly poled high-power thyristor elements. The number of thyristor elements utilized in each leg depends on the desired current handling capability of the switch. Of course it is to be understood that legs 7 may each comprise only a single power thyristor element, it such is desired. To form a higher voltage switch, additional thyristors can be respectively connected in series with those shown, if desired.

Figure 2:
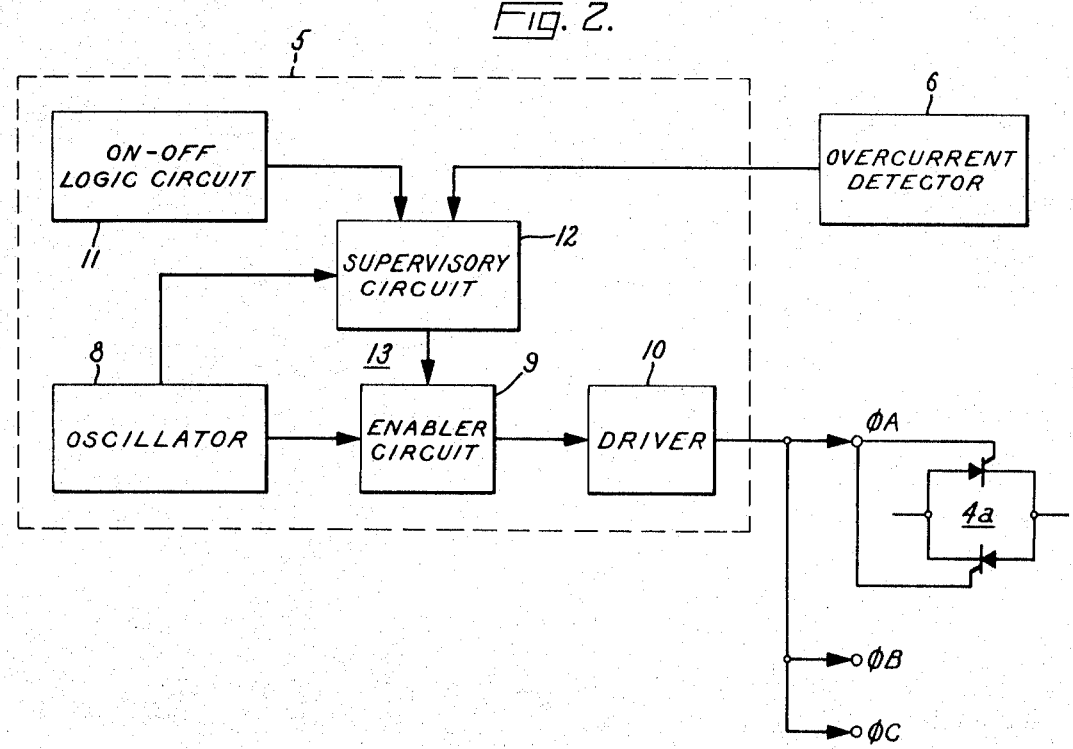
FIG. 2 is an expanded functional block diagram of a portion of he system shown in FIG. 1.

Control circuit 5, in its "ON" mode, provides suitable gate signals to the thyristors making up switch 4 to render the switch conductive, whereupon load current is able to flow between the source 1 and the load 3. In its "OFF" mode no gate signals are provided by control circuit 6 to any of the switch thyristors. Hence, when control circuit 6 is in this mode the static switch 4 should block the flow of load current. As can be seen in FIG. 2, the control circuit 5 includes a signal produce or oscillator 8, an enabler circuit 9, a wave-shaping driver circuit 10, an ON-OFF logic circuit 11, and a supervisory circuit 12. The output of control circuit 5 is supplied to the gate electrodes of each of the phase switches (only the phase A switch being shown in FIG. 2).

Oscillator 8 is normally operative for continuously producing a train of discrete control signals which are utilized to render switch 4 conductive. The control signals or pulses are of very short duration and high repetition frequency, for example 30 microseconds on and 120 microseconds off. These signals are fed to the enabler circuit 9. When enabled, circuit 9 allows the control signals to activate the driver circuit 10. The purpose of the latter circuit is to amplify and shape the control signals to provide output trigger signals or pulses each having a steep rise time and a predetermined amplitude. Thus each thyristor switch receives a train of discrete gate pulses of appropriate magnitude, width, and polarity to trigger all of the parallel SCR's comprising the switch whenever load current conduction is desired.

When the circuit 9 is disabled the control signals are precluded from activating the driver circuit and hence the output of control circuit 5 is devoid of trigger signals. The state of the enabler circuit 9 is controlled by a supervisory circuit 12 which is coupled to the logic circuit 11 and the overcurrent detector 6 and is adapted to receive input signals from either.

Before describing in more detail the illustrated embodiment of my invention, the operation of the static switch will be briefly explained. When the control circuit is in the OFF mode enabling circuit 9 is disabled. When disabled circuit 9 prevents the continuously produced control signals from affecting triggering of the switch 4. Accordingly, when control circuit 5 is in the OFF mode switch 4 blocks the flow of load current.

When load current conduction is desired, an ON command is given to the ON-OFF logic current 11 which provides an ON signal to supervisory circuit 12. Supervisory circuit 12 is operative for determining whether or not a control signal from free running oscillator 8 is in existence. If a control signal is in existence at the time the ON command is given, supervisory circuit 12 continues to disable the enabling circuit 9, and consequently the portion of that control signal following the ON command is prevented from activating to the driver circuit.

Upon the termination of that control signal supervisory means 12 reenables circuit 9, whereupon the first successive control signal subsequent to the ON command is enabled to activate the driver circuit to provide an amplified and shaped trigger pulse to switch 4. If the ON command is given at a time between control signals, supervisory means 12 will immediately enable the circuit 9 which consequently releases all succeeding control signals for effecting triggering of the thyristor switch 7.

In the event that a fault current begins flowing and reaches a preselected magnitude, the supervisory circuit, in response to a signal from detector 6 indicative of that event is operative for disabling the enabling circuit, thereby suppressing the switch trigger signals.

Figure 3:
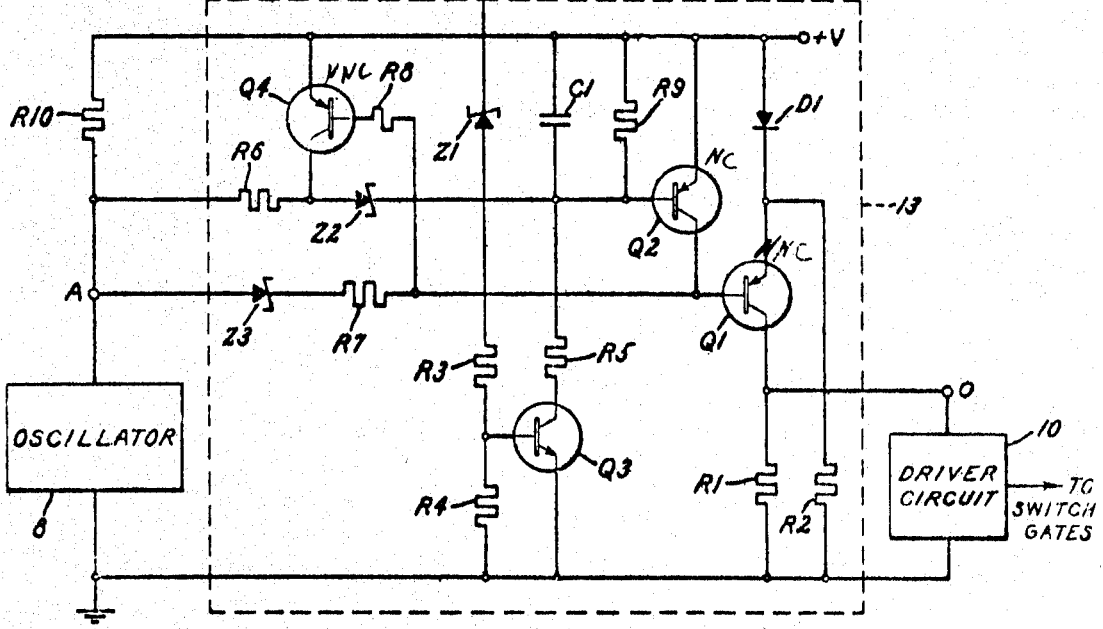
FIG. 3 is a schematic circuit diagram of a portion of that shown in FIG. 2, which diagram illustrates a practical embodiment of my invention.

FIG. 3 is a schematic diagram of a portion of the control circuit shown in FIG. 2. The circuit portion shown inside the dotted lines, hereinafter referred to as the turn on direction circuit 13, corresponds to the combination of the enabler circuit 9 and the supervisory circuit 12. The turn on direction circuit comprises a semiconductor switching element or transistor Q1 which, when conductive, provides the means for supplying control signals from oscillator 8 to driver 10 via output resistor R1. Diode D1, connected between the emitter of Q1 and a point of positive bias voltage V, in combination with resistor R2, connected between the emitter of Q1 and ground, serve to provide a small negative bias on the emitter of Q1 and thereby set the voltage level required at Q1's base to enable it to conduct.

Conduction of Q1 is controlled by another semiconductor switching element or transistor Q2. Transistor Q2, as can be seen, is connected between the positive potential point V and the base of Q1, thereby effectively shunting the emitter-to-base junction of Q1.

Conduction of transistor Q2 is in turn controlled by controlled means or transistor Q3. Resistor R3, R4 and R5 provide a biasing network required for transistor Q3. Transistor Q3 is rendered conductive in response to a positive signal of a preselected magnitude provided at its base. The positive signal is provided at input I from the ON-OFF logic circuit whenever that circuit is in its OFF mode. A positive signal will also be provided at point I from the overcurrent detecting circuit 6 whenever a fault current of a preselected magnitude is detected. Zener diode Z1 is connected between point I and resistor R3 and serves to prevent conduction of transistor Q3 as the result of low level noise signals.

Resistor R6 is connected between point A, the output of oscillator 8, and the anode of zener diode Z2 and serves as a bias resistor for transistor Q2. Resistor R7 is connected between the cathode of zener diode Z3 in the base of transistor Q1 and serves as a bias resistor therefor. Zener diode Z2 and Z3 serve to prevent malfunctions due to noise signals.

Another transistor, Q4, is provided to preclude conduction by transistor Q2 at a certain point in the cycle of operation of the turn on directing circuit (to be explained later). Transistor Q4 is connected between point V and the anode of zener diode 22. Resistor R9 serves to limit transistor Q4's base current.

Capacitor C1 is provided shunting the emitter-to-base junction of transistor Q2 in insure that transistor Q4 turns on before Q2 at a certain point in the cycle of operation (to be explained later). Resistor R9 is connected in parallel with capacitor C1 and serves as a noise suppressor and energy dissipator for capacitor C1. The output of oscillator 8 is provided across output resistor R10 which is connected between point A and point V.

Figure 4:
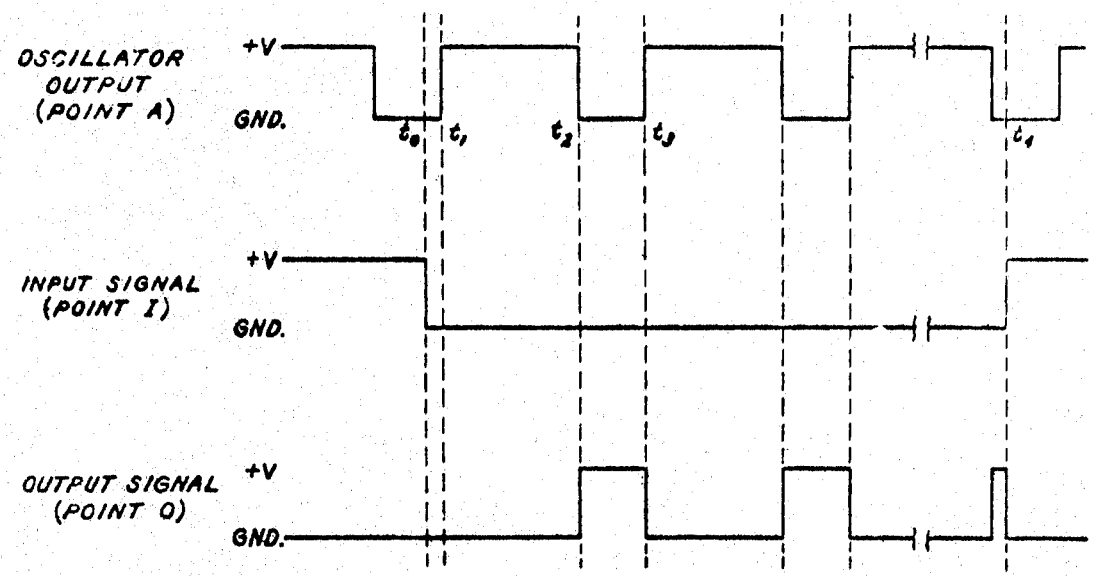
FIG. 4 is a graph of electrical signals existing at selected points in FIG. 3.

Detailed operation of the control circuit 5 will be apparent from the following discussion and reference to the circuit shown in FIG. 3 and the graphs shown in FIG. 4.

Prior to receipt of an ON signal from the ON-OFF logic circuit a positive voltage V appears at point I. This voltage biases transistor Q3 into conduction which in turn biases transistor Q2 on. When Q2 is conducting the emitter-to-base junction of transistor Q1 is effectively shorted or clamped (discounting the small forward voltage drop across diode D1) which precludes or inhibits Q1 from becoming conductive. When clamped transistor Q1 is unavailable to provide output signals to driver circuit 10 irrespective of the state of the output of oscillator 8. Thus, load current conduction through static switch 4 is precluded.

When load current conduction is desired an ON command is given to ON-OFF logic current 11 which in turn provides an ON signal to input I of the turn on directing circuit. The ON command, being a completely random event, may occur at any time in the cycle of operation of the oscillator 8.

By way of example, it shall be assumed that the ON command is given at a time during the production of a control signal, which time shall hereinafter be denoted at $t_0$. At this time the signal at point I drops from V to ground which causes transistor Q3 to turn off. Since the output of oscillator 8, i.e., point A, is at ground potential at $t_0$, transistor Q2 will be forward biased via resistor R6 and zener diode Z2. Accordingly, transistor Q2 will remain on notwithstanding the fact that Q3 will have turned off. The continued conduction of transistor Q2 results in maintaining the emitter-to-base junction of Q1 clamped, whereupon output signal 0 remains at ground potential.

At time $t_1$ the control signal, which was in existence during the ON command, terminates the point A goes from ground to V volts, whereupon the forward biasing for the emitter-to-base junction of transistor Q2 ceases. At this point Q2 ceases conducting and in so doing unclamps transistor Q1. Even though unclamped, transistor Q1 is unable to conduct owing to the fact that no forward bias is available for its emitter-to-base junction. Therefore, the output signal at point 0 remains at ground potential.

At time $t_2$ oscillator 8 begins producing the next successive control signal, i.e., the first control signal following the ON command. As the voltage at point A drops to ground potential both transistors Q2 and Q4 try to turn on. But capacitor C1, which is connected across the emitter-to-base junction of transistor Q2, insures that forward biasing of that junction is delayed with respect to forward biasing of transistor Q4. As soon as Q4 begins conducting it shorts the emitter-to-base junction of transistor Q2 and thereby precludes the latter from turning on. Since Q2 cannot turn on the emitter-to-base junction of transistor Q1 remains unclamped. Therefore, the ground voltage signal at point A is operative to forward bias the emitter-to-base junction of Q1 via resistor R7 and zener diode Z3. As Q1 begins conducting the output signal at point 0 is raised to V volts (disregarding the small voltage drop across diode D1 and transistor Q1). This positive signal, of duration $t_2$ to $t_3$, is provided to driver circuit 10 where its rise time is sharpened and its magnitude increased. Once amplified and shaped it is denoted as a trigger signal and is provided to the gate electrodes of switch 4 in order to render the switch conductive.

As long as the voltage at point I remains at ground potential, indicating that load current conduction through switch 4 is to continue, each successive control signal is enabled to pass to driver 10 and thus to switch 4.

By insuring that only full-width trigger signals are provided, I am able to protect the switch 4 from damage by the high $di/dt$ which results if the switch were closed on a pre-existant fault. For example, if the load had become a short circuit before time $t_0$, once the switch is triggered it will begin to conduct a steeply rising fault current. If the remaining portion of the control signal in existence at time $t_0$ were allowed to affect triggering in this circumstance, it might expire before enough junction area in the SCR were turned on to accommodate the rapid rise of anode current. But owing to the fact that the switch is not triggered until time $t_2$, the initial trigger signal will subsist for its maximum duration (e.g., 30 microseconds) and safe turn on is provided. Thus the chance of damaging the switch is minimized.

Once the fault current builds up in magnitude to a preselected level, overcurrent detector 6 provides an OFF signal of V volts to input I of the turn on directing circuit. By way of example, an OFF signal is shown in FIG. 4 as occurring at $t_4$ (during the creation of some subsequent control signal). Upon receipt of the OFF signal transistor Q3 is biased on thereby turning transistor Q2 on which effects clamping of the emitter-to-base junction of Q1. Once Q1 is clamped conduction therein ceases and the signal at output point 0 drops to ground potential. Hence the portion of the control signal occurring after $t_4$ is prevented from being supplied to the driver circuit and thus to switch 4. Further, no other control signals are enabled to trigger switch 4 until point I is again at ground potential.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim and desire to secure by Letters Patent of the United States is:

1. In combination with a thyristor switch adapted to conduct load current between a voltage source and an electric power load and a control circuit including first means normally operative to produce a continuous train of discrete control signals and second means for enabling said control signals to effect turn on of said switch in response to an ON command which is given to the control circuit when load current conduction is desired, the improvement comprising: supervising means coupled to said second means for temporarily disabling said second means if a control signal is in existence when the ON command is given and for then reenabling said second means in tim to allow the first successive control signal following in ON command to effect turn on of said switch.

2. The combination as specified in claim 1 wherein said second means includes a first semiconductor switching element which is operative when conductive for enabling said control signals to effect turn on of said switch and wherein said supervising means includes a second semiconductor switching element coupled to said first semiconductor element and operative when conductive for inhibiting conduction of said first semiconductor element.

3. The combination as specified in claim 3 additionally comprising means for detecting the presence of a fault in the power system and for providing an OFF signal indicative thereof and wherein said supervising means additionally includes means for controlling conduction of said second semiconductor element, said control means rendering said second semiconductor element conductive in response to the presence of an OFF signal or the absence of an ON command.

4. The combination as specified in claim 1 wherein said control signal are short duration pulses and wherein said second means is reenabled at the termination of any control pulse in existence when the ON command is given.

* * * * *